United States Patent [19]

Neier et al.

[11] Patent Number: 5,782,559
[45] Date of Patent: Jul. 21, 1998

[54] SELF-PROPELLED MATERIAL MIXER

[75] Inventors: Benjamin R. Neier, Dodge City; Dennis W. Waldron, Great Bend, both of Kans.

[73] Assignee: J-Star Industries, Inc., Ft. Atkinson, Wis.

[21] Appl. No.: 706,655

[22] Filed: Sep. 6, 1996

[51] Int. Cl.$^6$ ........................................ B01F 13/00
[52] U.S. Cl. ........................ 366/279; 366/297; 366/349
[58] Field of Search ........................ 366/292, 297, 366/282, 283, 349, 61, 279; 180/14.3, 53.4; 239/722, 146, 147

[56] References Cited

U.S. PATENT DOCUMENTS

| | | | |
|---|---|---|---|
| 2,680,377 | 6/1954 | Gerst | 366/61 |
| 2,781,186 | 2/1957 | Harbers et al. | 366/61 |
| 2,953,360 | 9/1960 | Kline | 366/297 |
| 2,968,915 | 1/1961 | Feistel, Jr. | 366/61 |
| 3,080,152 | 3/1963 | Lendved | 366/61 |
| 3,168,295 | 2/1965 | Dorrell et al. | 366/61 |
| 3,215,411 | 11/1965 | Pitts | 366/61 |
| 3,272,515 | 9/1966 | Wood | 366/297 |
| 3,658,303 | 4/1972 | Funk | 366/61 |
| 3,942,768 | 3/1976 | Hughes | 366/297 |
| 5,379,940 | 1/1995 | Knight et al. | 366/297 |

OTHER PUBLICATIONS

Supreme Cutter–Mixer–Feeder Brochures, no date.

*Primary Examiner*—Tony G. Soohoo
*Attorney, Agent, or Firm*—Zarley, McKee, Thomte, Voorhees, & Sease

[57] ABSTRACT

A self-propelled material mixer is provided for mixing fluent and non-fluent material. The material mixer includes a mixing tank having one or mixing members therein. A drive system delivers power to the wheels of the material mixer. An operator maneuvers the material mixer using a control mechanism that controls both the speed and direction of the mixer.

11 Claims, 4 Drawing Sheets

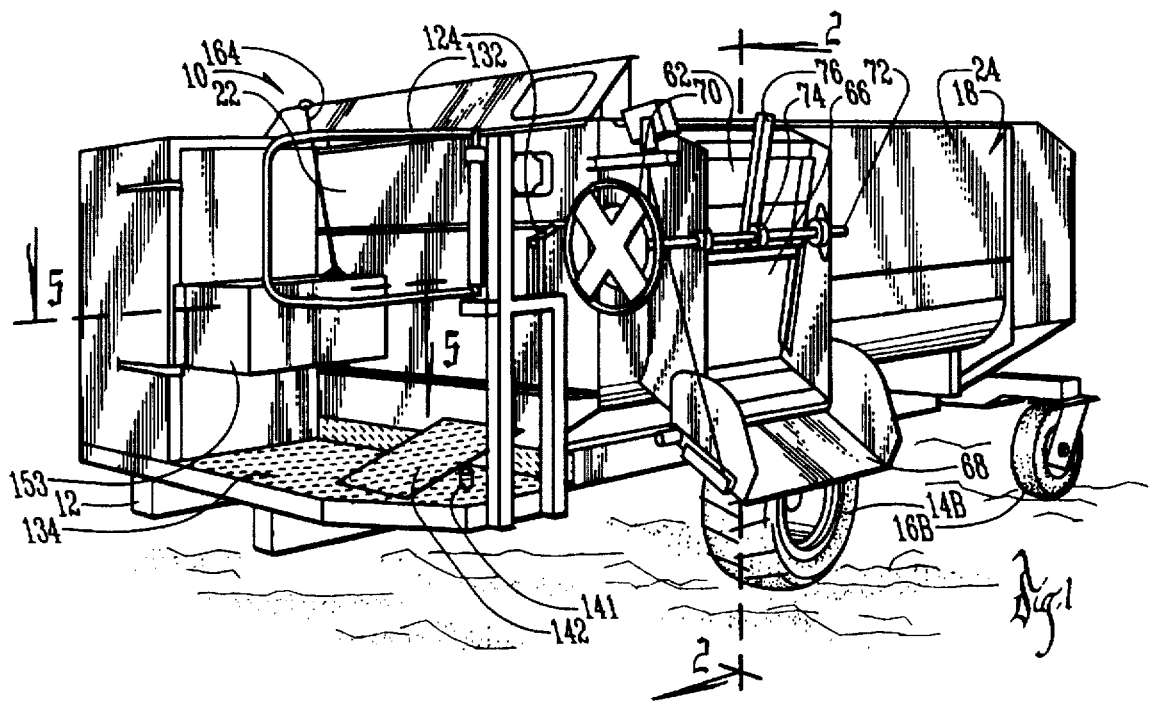
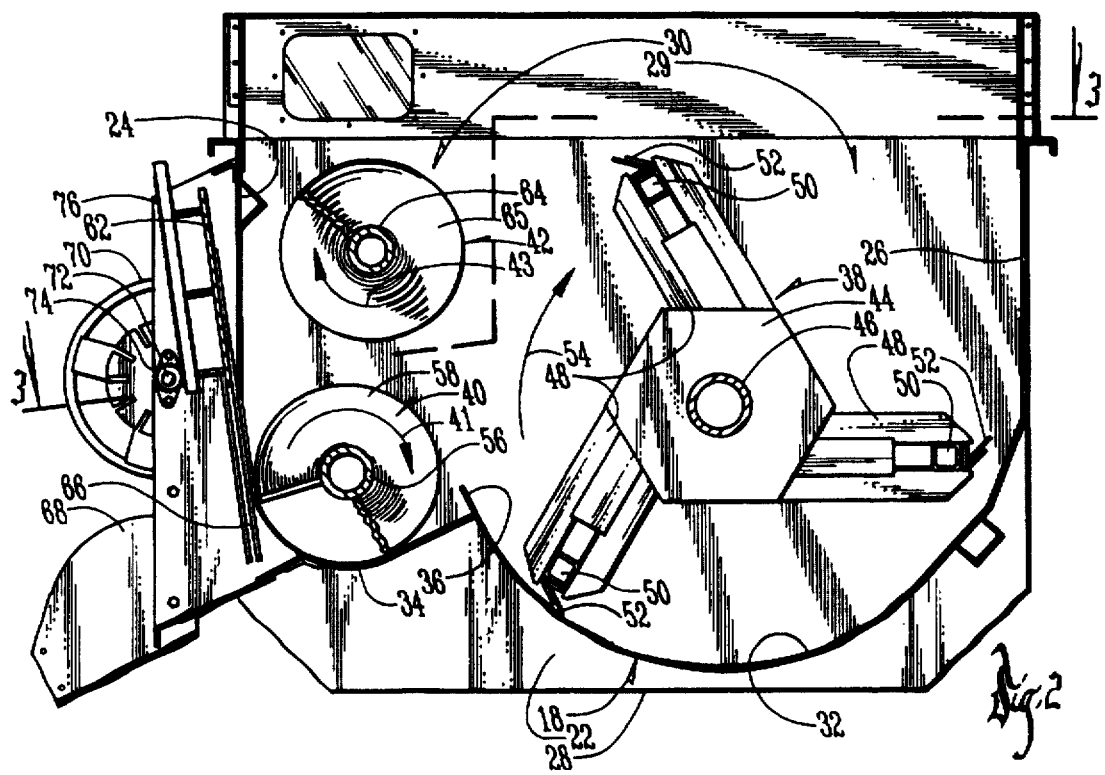

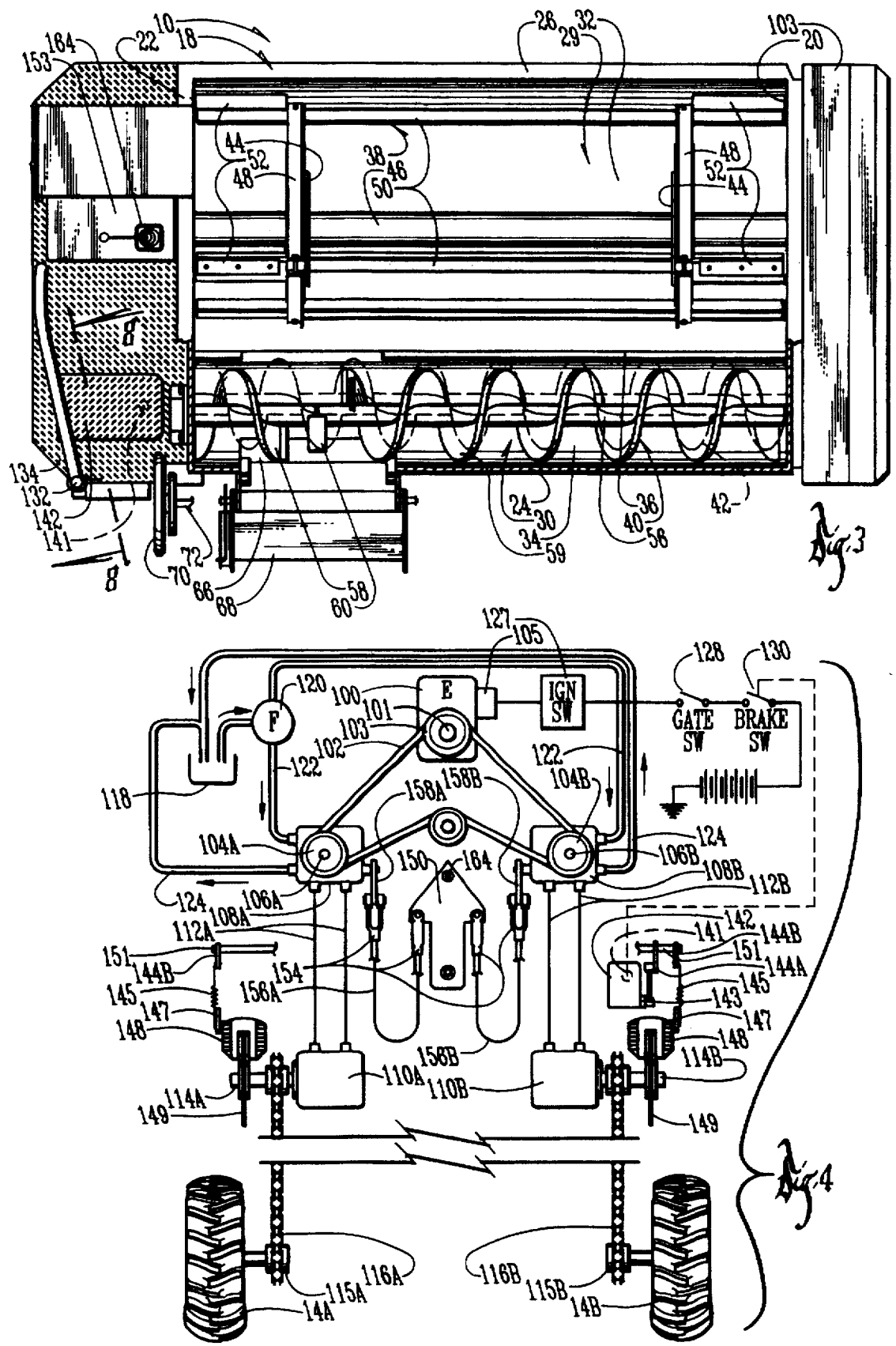

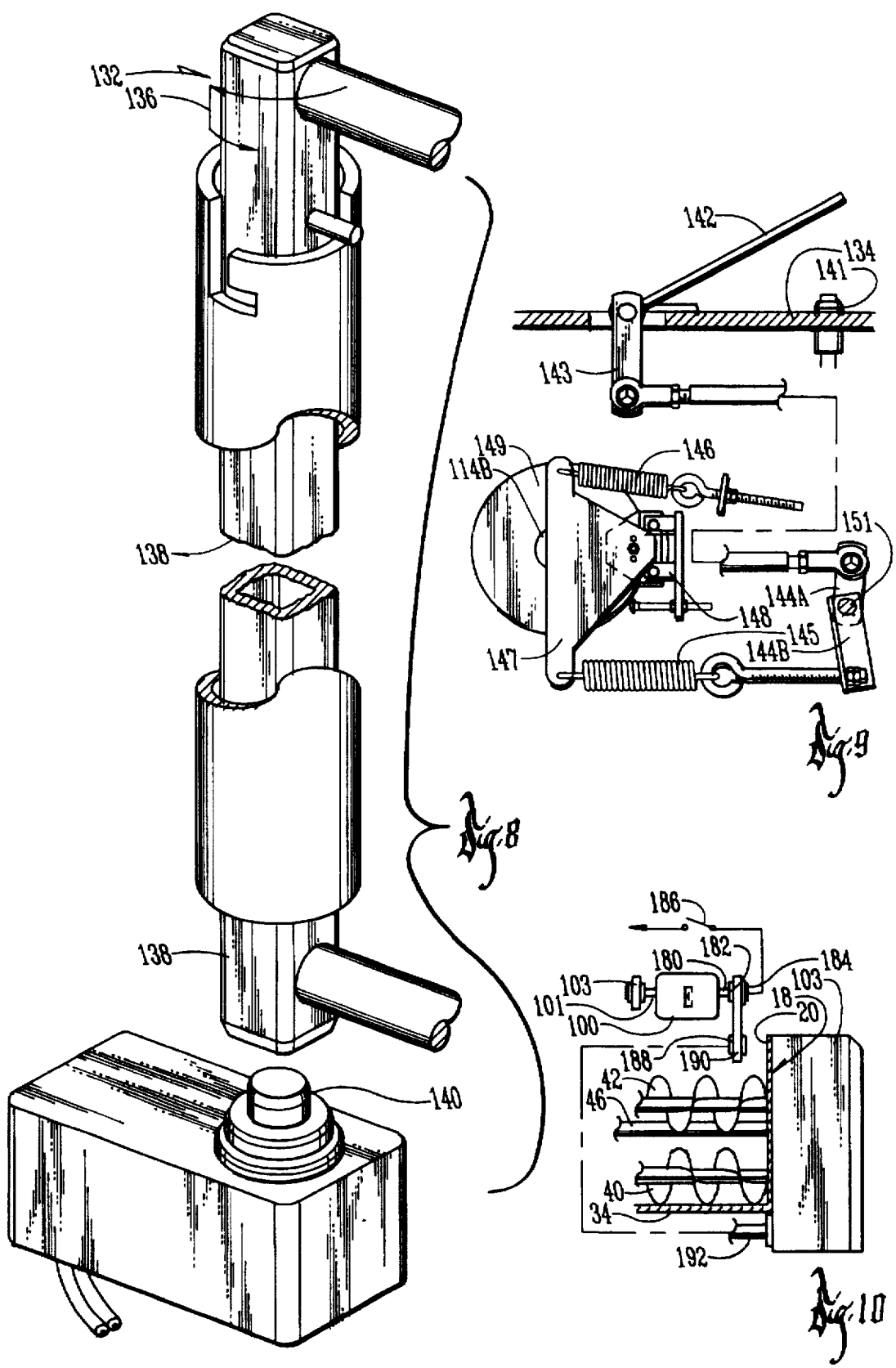

SELF-PROPELLED MATERIAL MIXER

BACKGROUND OF THE INVENTION

The present invention relates to a self-propelled material mixer for fluent and non-fluent material.

Feed mixers are generally known in the art. In the cattle and dairy farming industries, for example, it is common for farmers to mix and distribute large quantities of hay, silage and grain to feeding troughs. Many prior art mixers are towed by tractors. Other prior art models are mounted on trucks. Using a tractor or truck to transport and maneuver a feed mixer is undesirable for many reasons, however. In addition to the cost of the mixer, the farmer must also incur the cost of buying and maintaining a tractor or truck. This is particularly troublesome for farmers with small-scale operations who cannot easily absorb the substantial cost of an additional vehicle.

In addition to the expense of a tractor, it is difficult to maneuver a mixer with a tractor tow. A towing vehicle cannot easily make tight turns and reverse directions with great accuracy. Further, the operator is situated a long distance from the discharge opening. For these reasons, it is difficult to align the discharge opening of the mixer with the feed trough.

Thus, there is a need in the art for a material mixer that is cost efficient and easy to maneuver.

Accordingly, the primary objective of the present invention is to provide a self-propelled material mixer.

A further object of the present invention is to provide a self-propelled material mixer that is cost effective.

Another object of the present invention is to provide a self-propelled material mixer that is easy to maneuver.

Another object is to provide a self-propelled material mixer with efficient and effective mixing capabilities.

A still further object of the present invention is to provide a self-propelled material mixer which is efficient in operation, economical to manufacture, and durable in use.

SUMMARY OF THE INVENTION

The foregoing objects are achieved, in the preferred embodiment of the invention, by a self-propelled material mixer. The self-propelled material mixer includes a mixing tank having one or more rotary mixing members therein. The rotary mixing members cycle materials in the tank to provide a good mix before the materials are emptied from the tank. The mixing tank is supported by wheels with a drive system being connected to at least one of the wheels. The drive system of the present invention is not limited to hydraulic transmissions, but also includes other drive systems such as mechanical transmissions and electric motors.

The operator maneuvers the self-propelled material mixer using a control mechanism that controls both the speed and direction of the mixer. The control system includes the preferred embodiment as well as conventional steering and throttling mechanisms. The drive system and the control system obviate the need for an additional vehicle to transport and maneuver the mixer.

BRIEF DESCRIPTION OF THE DRAWINGS

FIG. 1 is a perspective view of the self-propelled material mixer of the present invention.

FIG. 2 is a sectional view of the mixing tank, taken along line 2—2 of FIG. 1.

FIG. 3 is a sectional view taken along line 3—3 of FIG. 2.

FIG. 4 is a schematic of the drive system and the control mechanism of the preferred embodiment.

FIG. 8 is a cutaway partial perspective view of the safety gate.

FIG. 9 is a schematic of the mechanical braking system.

FIG. 10 is a schematic view of the drive system for the mixing members within the mixing chamber.

DETAILED DESCRIPTION OF THE PREFERRED EMBODIMENT

Figure 6:
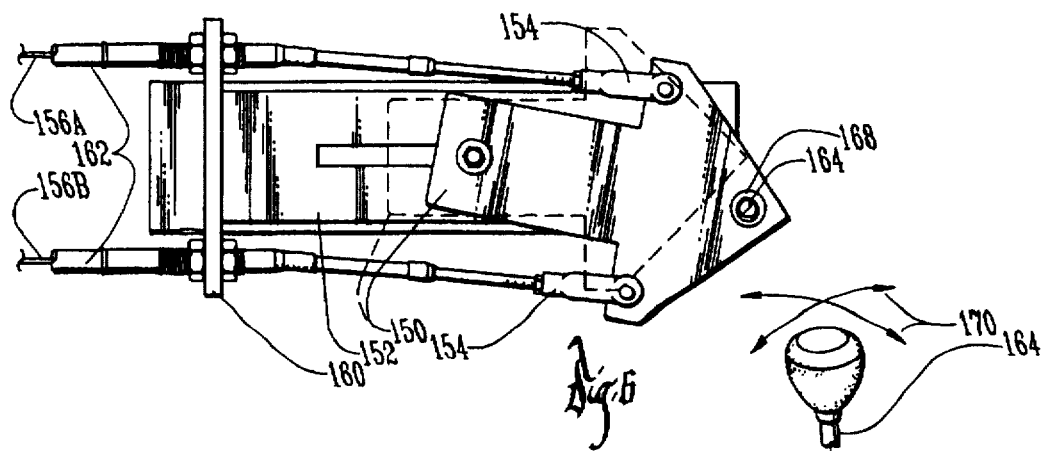
FIG. 6 is a top elevational view of the control mechanism taken along line 6—6 of FIG. 5, showing the movement of the control plate in response to the movement of the control lever.

The self-propelled material mixer 10 of the present invention is supported on a frame 12 having a pair of rearward wheels 14A and 14B and forward wheels 16A and 16B (see FIG. 1). The self-propelled material mixer 10 includes a mixing tank 18 having forward and rearward end walls 20 and 22, opposite side walls 24 and 26 and a bottom wall 28.

The mixing tank 18 includes a main chamber 29 and an auxiliary chamber 30 (FIG. 2) which have curved walls 32 and 34, respectively. An elongated flange 36 extends from curved wall 32 at the junction of curved walls 32 and 34 and spans the length of the tank except for the portion aligned with and adjacent the discharge opening 66.

FIG. 2 illustrates the arrangement of the rotary mixing members within the mixing tank. These include a rotor 38 in main chamber 29, and a pair of stacked augers including a lower auger 40 and an upper auger 42 in auxiliary chamber 30. Each of these mixing members include central shafts which are rotatably supported in their respective chambers.

The rotor 38 has two hexagonal plates 44 that are welded around a central shaft 46 toward opposite ends of the central shaft. Rotor arms 48 are welded with and extend from the hexagonal plates 44. The rotor arms 48 are aligned in pairs between the two hexagonal plates 44. Elongated rotor bars 50 are axially extended between and connected to the outer ends of each aligned pair of rotor arms 48. Wiper plates 52 are connected to the rotor bar at an angle, as shown in FIG. 2.

The rotor bars 50 turn and mix the material in the main chamber 29 in response to the rotation of the rotor 38 in the direction of the arrow 54. As the rotor 38 turns, some of the material is circulated in a rotary path within the main chamber 29 while being agitated by the rotor bars 50. The wiper blades 52 also force other material upwardly over the elongated flange 36 toward the lower auger 40.

Once the material is moved into the auxiliary chamber 30, the flighting 58 on the rear portion of the lower auger 40 moves material forwardly toward a discharge opening 66. The forward end of lower auger 40 (FIG. 3) includes reverse flighting 59 which moves material rearwardly toward the discharge opening 66. A curved paddle 60 located adjacent discharge opening 66 moves the material laterally out the discharge opening 66 when the discharge door 62 is open. When the discharge door 62 is closed, paddles 60 move the material upwardly to the upper auger 42 where it is then circulated toward the forward end wall 20 and allowed to spill over into the main chamber 29.

The upper auger 42, which rotates in the direction of the arrow 43, is mounted on a central shaft 64 and has flighting along substantially its entire length to direct material toward the forward end wall 20. A paddle (not shown) is positioned on the upper auger 42 near the forward end wall 20 and serves to move the grain laterally into the main chamber 29 or downwardly to the lower auger 40.

All of the central shafts 46, 56, and 64 used for mounting the mixing members are driven by an internal combustion engine 100. FIG. 4 shows a schematic representation of the internal combustion engine 100 having a first output shaft 101 for powering the rearward wheels 14A and 14B. As shown in FIG. 9 engine 100 also has a second drive shaft 180 extending from its side opposite shaft 101 for driving a forwardly extending drive shaft 192 which drives gear box 103 at the forward end of the mixing tank 18. Gear box 103 drives the central shafts 46, 56, and 64 of rotor 38 and augers 40, 42.

The discharge door assembly includes a discharge opening 66, a discharge door 62, and a discharge chute 68 which extends downwardly and outwardly from the discharge opening 66. The discharge door 62 is opened and closed by rotating the discharge wheel 70. The discharge wheel 70 is mounted on a shaft 72 that is connected to a gear wheel 74. The gear wheel 74 is engaged with teeth 76 on the outside surface of the discharge door 62.

FIG. 4 shows a schematic view of the drive system used to propel the material mixer 10 and the control mechanism used to direct the drive system. The drive system of the present invention is not limited in scope to the design in FIG. 4, nor is it limited to hydraulic transmissions in general. Instead, common driving systems such as mechanical transmissions and electric motors can also be used with the present invention.

In the preferred embodiment a pair of separate hydraulic motors 110A, 110B drive the rearward wheels 14A and 14B respectively. Variable displacement hydraulic pumps 108A, 108B are connected in a closed circuit with hydraulic motors 110A and 110B by two pairs of hydraulic lines 112A and 112B, respectively. One line is used to initiate forward motion, the other rearward motion.

Each variable displacement hydraulic pump 108A and 108B is generally of a conventional structure wherein a plurality of movable pistons are mounted within a rotatable cylinder block and are caused to stroke axially of the cylinder block by means of a swash plate. The position of the swash plate can be varied about a rotational axis to vary the stroke of the pistons and, thus, the displacement of the pump. Control handles 158A and 158B are external to the pumps and are fixed to the swash plates. Rotation of the control handles 158A and 158B varies the displacement of the pumps 108A and 108B, respectively. The details of the control mechanism used to coordinate the rotation of the control handles is discussed in detail below.

The entire hydraulic circuit is a closed loop design. Oil from the reservoir 118 is directed through a filter 120, through intake lines 122, and into hydraulic pumps 108A and 108B. Overflow oil is returned to the reservoir 118 through drain lines 124.

Internal combustion engine 100 includes a drive pulley 103 mounted on an output shaft 101. Pulley 103 drives a belt 102, which in turn rotates pulleys 104A and 104B. Pulleys 104A and 104B drive input shafts 106A and 106B of the variable displacement hydraulic pumps 108A and 108B, respectively. Each hydraulic motor 110 has an output shaft 114 for driving a rearward tire 14. In the preferred embodiment, a chain mechanism 116A and 116B transmits power from the output shafts 114A and 114B to the axles 115A and 115B of the rearward tires 14A and 14B.

A clutch 105 is shown schematically for imparting drive from the engine output shaft 101 to the drive pulley 103. To engage clutch 105, the ignition switch 127, gate switch 128, and brake switch 130 must all be closed. The gate switch 128 and brake switch 130 are safeguards to insure that the operator is positioned correctly on the driving platform 134 behind the mixing tank 18. A partial perspective of the safety gate 132 is shown in FIG. 8. After the operator steps into the driving position on the driving platform 134, the operator then rotates the safety gate 132 in the direction of the arrow 136. This lowers the internal rectangular shaft 138 of the safety gate which depresses the gate button 140 and closes the gate switch 128.

A similar safety feature is used in conjunction with the brake release pedal 142 (see FIG. 9). A brake button 141 is positioned on the surface of the driving platform 134. When the brake release pedal 142 is depressed, the brake button 141 is depressed thereby closing the brake switch 130. Accordingly, when the brake release pedal 142 is released, the brake switch is opened and the clutch 105 is disengaged.

The brake release pedal 142 also controls the mechanical braking of the mixer. As shown in the schematic in FIG. 9, depressing the brake release pedal 142 rotates rigid member 143, which in turn pivots arms 144A and 144B. Arms 144A and 144B are fixedly attached to one another and rotate about shaft 151. When the arms 144A and 144B pivot, the difference in tension between springs 145 and 146 causes the brake clamp 147 to release the brake caliper 148 positioned around the brake disc 149. Similarly, when the brake release pedal 142 is not depressed, the brake caliper 148 remains tight around the brake disc to prevent the axles 114A and 114B from rotating. As an alternative to using the brake release pedal for mechanical braking, a hand-operated brake attached to a brake band around a drum on the wheel assembly can be used (not shown).

Figure 5:
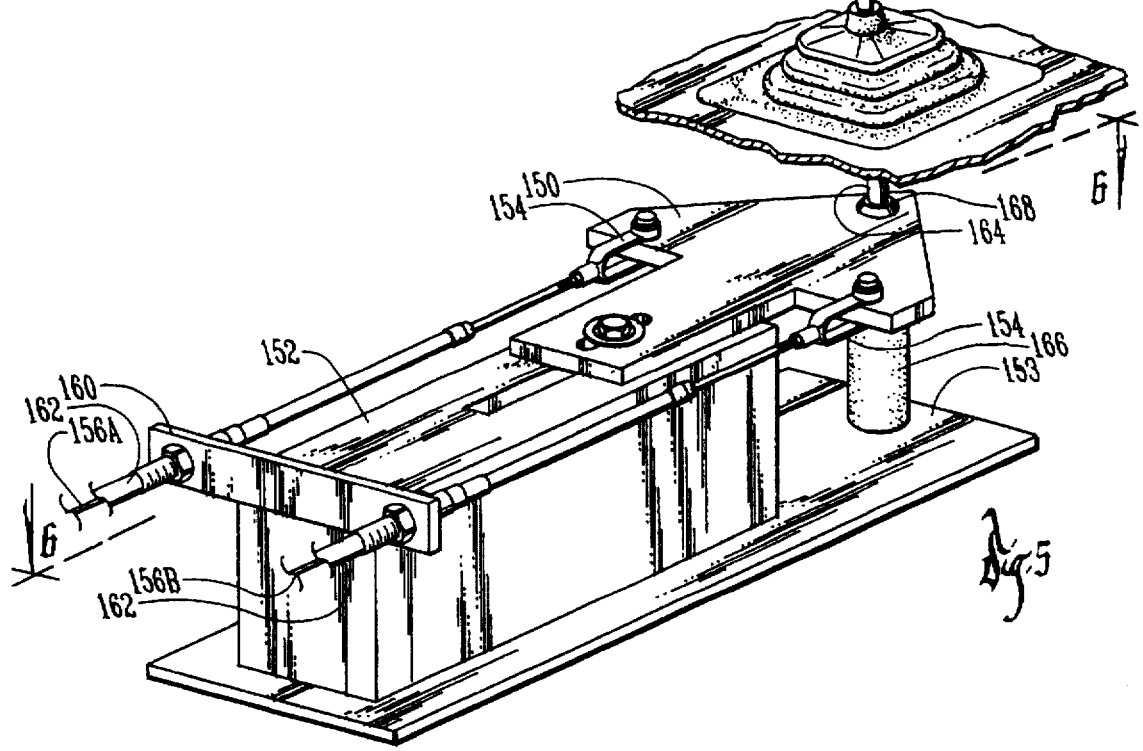
FIG. 5 is a perspective view of the control mechanism of the preferred embodiment.
Figure 7:
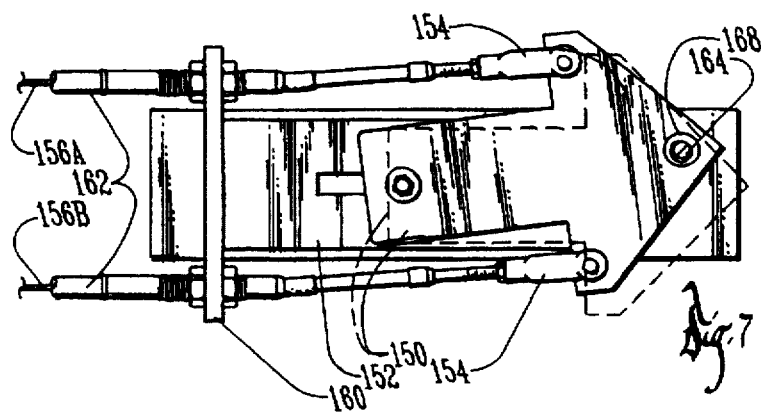
FIG. 7 is the view of FIG. 6 showing further movement of the control plate.

The preferred embodiment of the control mechanism for directing the drive system of the self-propelled material mixer 10 is shown in FIGS. 5–7. The control mechanism is not limited in scope to the preferred embodiment as described below, but includes other conventional steering and throttling mechanisms. In the preferred embodiment, a control plate 150 is slidably and pivotally mounted upon a base 152. Cables 156A and 156B connect the control plate 150 with the control handles 158A and 158B of the variable hydraulic displacement pumps 108A and 108B. The cables 156A and 156B function as actuating members, rotating the control handles 158A and 158 in response to the control plate 150. The cables 156A an 156B are housed in cable sleeves 162. Clevises 154 connect cables 156A and 156B to the control plate 150 and to the control handles 158A and 158B, respectively. The clevises 154 are connected to opposite sides of the control plate 150 so that displacement of the control plate effectuates a proper differential in displacement between the cables 156A and 156B. The cable sleeves 162 and alignment bar 160 guide the cables and maintain their proper alignment.

An operator uses a control lever 164 to coordinate both the speed and direction of the material mixer 10. The control plate 150 slides and pivots in response to the control lever 164. The control lever 164 is pivotally mounted on mounting member 166 and passes through eyelet 168 in the control plate 150. As illustrated by the arrows 170, the control lever 164 is allowed to freely pivot. The control plate 150 and base 152 are housed in a control box 153 with the control lever positioned on the upper surface of the box (see FIGS. 1 and 3).

FIGS. 6 and 7 illustrate how the control plate 150 is responsive to the movement of the control lever 164. The pivot of the control level 164 determines the displacement of and differential between the variable displacement hydraulic pumps 108A and 108B. The operator controls both the speed and direction of the material mixer 10 with the control lever 164. For example, as shown in FIG. 6, moving the control lever 164 forward and to the right places the control plate 150 in a similar position, thereby causing a greater rotation of control handle 158A relative to control handle 158B. This in turn causes a differential between the hydraulic transmissions and the power applied to the wheels. This differential in power results in both the forward movement and a turning of the material mixer 10 to the right. Similarly, as illustrated in FIG. 7, moving the control lever rearward and to the left causes the oil to flow in the opposite direction in the hydraulic lines 112 and creates a differential where control handle 158B rotates more than control handle 158A. As a result, the material mixer 10 moves rearward and to the left.

Referring to FIG. 10, engine 100 includes a second output shaft 180 having a pulley 182 thereon. A clutch 184 is capable of actuation to drivingly engage and connect pulley 182 to output shaft 180. Clutch 184 is controlled by a control switch 186 located at the driver's station at the rear of the vehicle. A belt 188 is trained around pulley 182 and a pulley 190 which is on a drive shaft 192. Drive shaft 192 drives a gear box 103 which has three output shafts (not shown) for driving rotor 38, auger 40, and auger 42.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A self-propelled material mixer, comprising:

a mixing tank having at least one rotary mixing member therein and having a forward end and a rear end;

a driving platform adjacent said rear end of said mixing tank;

means for rotating said at least one rotary mixing member;

two wheels operatively attached to and supporting said mixing tank;

a drive system drivingly connected to at least one of said wheels; and a control mechanism operable from said driving platform and operatively connected to said drive system for controlling the operation of said wheels.

2. The self-propelled material mixer of claim 1 wherein said drive system comprises a hydraulic transmission.

3. The self-propelled material mixer of claim 1 further comprising a safety gate rotatably mounted proximate said driving platform between an open position and a closed position wherein an operator is at least partially enclosed on said driving platform.

4. The self-propelled material mixer of claim 3 wherein said safety gate enables said drive system in said closed position.

5. A self-propelled material mixer, comprising:

a mixing tank having at least one rotary mixing member therein;

means for rotating said at least one rotary mixing member;

two wheels operatively attached to and supporting said mixing tank;

a drive system that includes a first hydraulic pump hydraulically connected in a closed circuit with a first hydraulic motor, said first hydraulic motor being drivingly connected to at least one of said wheels; and a control mechanism operatively connected to said drive system for controlling the operation of said wheels.

6. The self-propelled material mixer of claim 5 further comprising a second variable displacement hydraulic pump hydraulically connected in a closed circuit with a second hydraulic motor, each of said first and second hydraulic motors drivingly connected to a different one of said wheels.

7. The self-propelled material mixer of claim 6 wherein said control mechanism comprises a base, a control plate slidably and pivotally mounted to said base, a control lever engaged with said control plate, a first actuating member operatively connecting said control plate and said first variable displacement hydraulic pump, and a second actuating member operatively connecting said control plate and said second variable displacement hydraulic pump, said control plate slidable and pivotal in a substantially horizontal plane and being responsive to the movement of said control lever, said first and second variable displacement hydraulic pumps being responsive through said actuating members to the pivot and slide of said control plate.

8. The self-propelled material mixer of claim 7 wherein said first actuating member is a first cable held in tension between said control plate and said first variable displacement hydraulic motor, and said second actuating member is a second cable held in tension between said control plate and said second variable displacement hydraulic motor.

9. A feed mixer comprising:

a frame having a mixing tank mounted thereon and forming a mixing chamber therein;

a plurality of ground engaging wheels rotatably mounted to said frame;

a power source supported on said frame;

a plurality of movable mixing members movably mounted within said mixing chamber;

a first transmission interconnecting said power source separately to a first wheel and a second wheel of said ground engaging wheels for rotating said first and second wheels to cause movement of said frame across the ground;

a second transmission interconnecting said mixing members and said power source for causing movement of said mixing members to mix materials within said mixing chamber; and a control mechanism connected to said first transmission for causing said first transmission to drive said first wheel at a first speed and said second wheel at a second speed and for selectively varying said first and second speeds to cause forward, rearward, or turning movement of said frame.

10. The feed mixer of claim 9 wherein said first transmission comprises a hydraulic transmission.

11. A feed mixer comprising:

a frame having a mixing tank mounted thereon and forming a mixing chamber therein;

a plurality of ground engaging wheels rotatably mounted to said frame;

a power source supported on said frame;

a plurality of movable mixing members movably mounted within said mixing chamber;

a first transmission interconnecting said power source separately to a first wheel and a second wheel of said ground engaging wheels for rotating said first and second wheels to cause movement of said frame across the ground;

a second transmission interconnecting said mixing members and said power source for causing movement of said mixing members to mix materials within said mixing chamber; and a control mechanism connected to said first transmission for causing said first transmission to drive said first wheel at a first speed and said second wheel at a second speed and for selectively varying said first and second speeds to cause forward, rearward, or turning movement of said frame, said control mechanism includes a base, a control plate slidably and pivotally mounted to said base, a control lever engaged with said control plate, a first actuating member operatively connecting said control plate and said first transmission, and a second actuating member operatively connecting said control plate and said first transmission, said control plate slidable and pivotal in a substantially horizontal plane and being responsive to the movement of said control lever, said first transmission delivering power through said power source separately to said first and second wheels in response to said actuating members and the pivot and slide of said control plate.

* * * * *